Dec. 10, 1957 W. B. EDDISON 2,815,627
SEAL OPENING AND APPLYING HEAD
Filed Feb. 15, 1954 5 Sheets-Sheet 1
FIG. I.
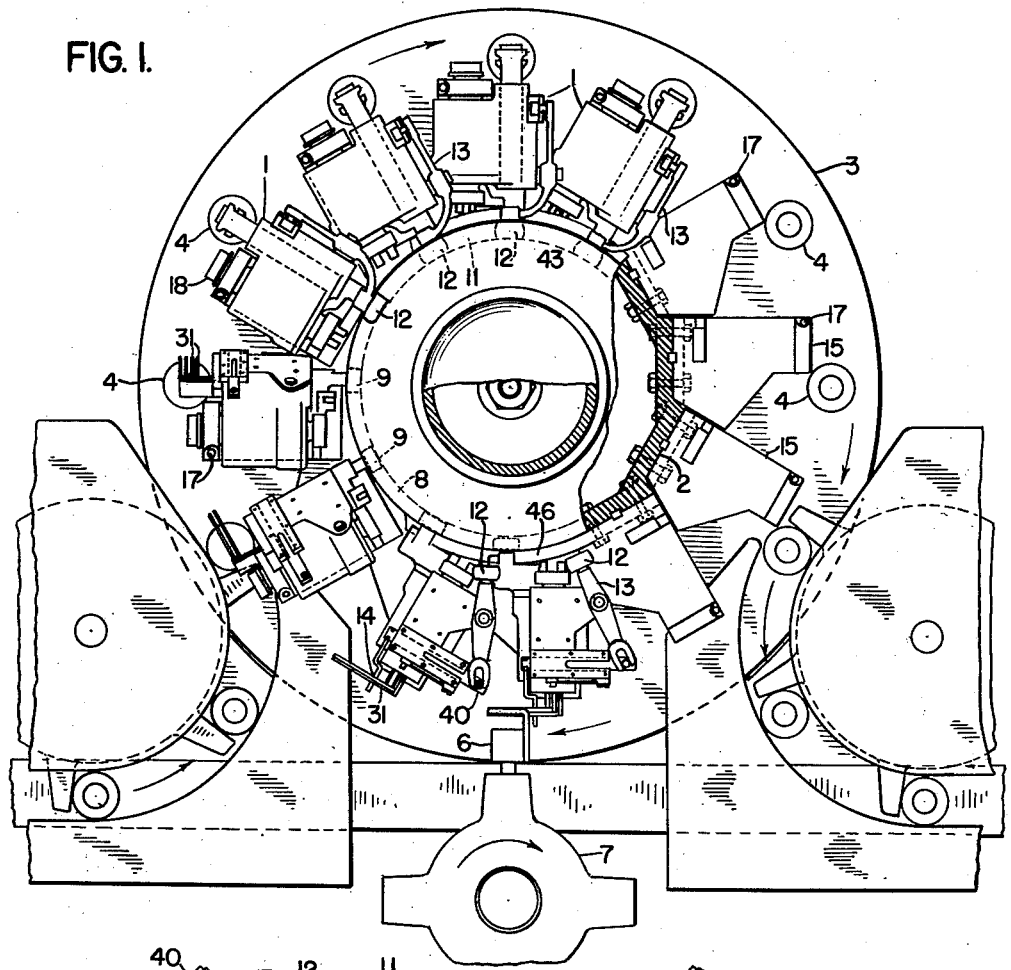
FIG. 2.
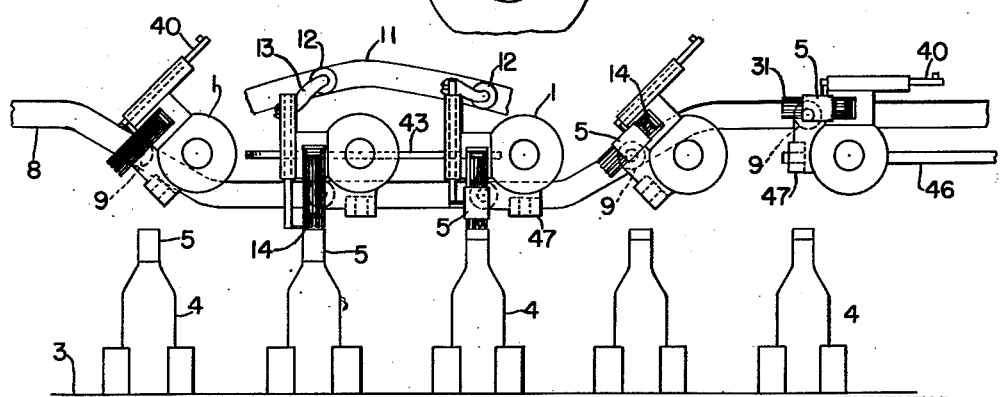
INVENTOR.
WILLIAM BARTON EDDISON
BY
Andrus & Scealer
Attorneys Dec. 10, 1957     W. B. EDDISON     2,815,627
SEAL OPENING AND APPLYING HEAD
Filed Feb. 15, 1954     5 Sheets-Sheet 2
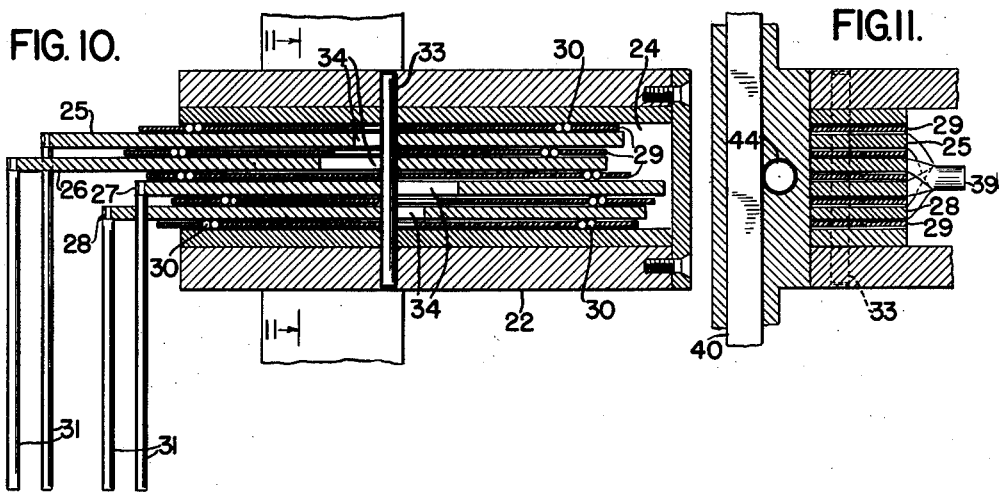
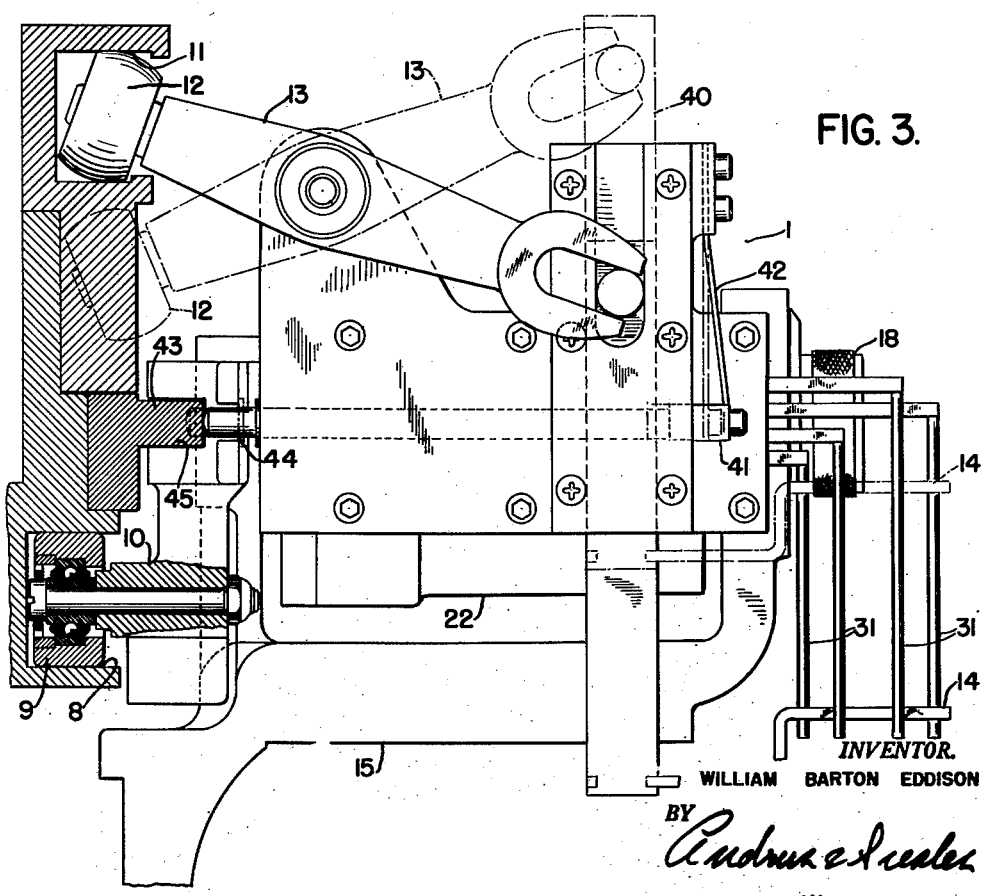

Dec. 10, 1957  W. B. EDDISON  2,815,627
SEAL OPENING AND APPLYING HEAD
Filed Feb. 15, 1954  5 Sheets-Sheet 3

INVENTOR.
WILLIAM BARTON EDDISON
BY
Attorneys

Dec. 10, 1957  W. B. EDDISON  2,815,627
SEAL OPENING AND APPLYING HEAD
Filed Feb. 15, 1954  5 Sheets-Sheet 4

INVENTOR.
WILLIAM BARTON EDDISON
BY
Attorneys

Dec. 10, 1957  W. B. EDDISON  2,815,627
SEAL OPENING AND APPLYING HEAD
Filed Feb. 15, 1954  5 Sheets-Sheet 5

INVENTOR.
WILLIAM BARTON EDDISON
BY
Andrus & Scealer
Attorneys

United States Patent Office 2,815,627
Patented Dec. 10, 1957

2,815,627

SEAL OPENING AND APPLYING HEAD

William Barton Eddison, Irvington, N. Y., assignor to Gisholt Machine Company, Madison, Wis., a corporation of Wisconsin Application February 15, 1954, Serial No. 410,194

10 Claims. (Cl. 53—291)

This invention relates to a seal opening and applying head for machines which apply sealing bands to bottle tops and the like.

Such heads are adapted to pick a tubular seal off from a two finger head, to open the seals to a substantially cylindrical shape and turn the axis thereof to a vertical direction, and then to apply the seal downwardly upon a bottle top indexed therewith.

Heretofore, such heads have been constructed employing eight fingers disposed substantially parallel to each other and which are carried by slide members actuated by racks and pinions and external cams in synchronism to the travel of the head. Difficulties have been encountered in maintaining the fingers parallel, due largely to the short bearing for the slides and looseness developed by wear.

The present invention overcomes these difficulties and provides a much simpler construction for the head and the actuating mechanism.

According to the invention each pair of fingers is mounted upon a separate slide plate having anti-friction bearing support and is actuated by a separate cam contained in the head in response to the rotation of the fingers when they turn the seal to vertical position. Turning of the fingers is effected by rotation of the plates on the axis of the head by a crank actuated by a cam adjacent the path of travel of the head.

The accompanying drawings illustrate the best mode contemplated for carrying out the invention.

In the drawings:

Figure 1 is a schematic top plan view of a portion of the machine showing the function of the heads;

Fig. 2 is a schematic developed view of the heads in various working positions;

Fig. 3 is a side elevation of the head in seal applying position with parts in section showing the lever for actuating the seal pusher;

Fig. 10 is a detail section of the finger plates and carrier taken on line 10—10 of Fig. 7; and Fig. 11 is a vertical section taken on line 11—11 of Fig. 10 showing the tongues attached to the finger plates.

Figure 4:
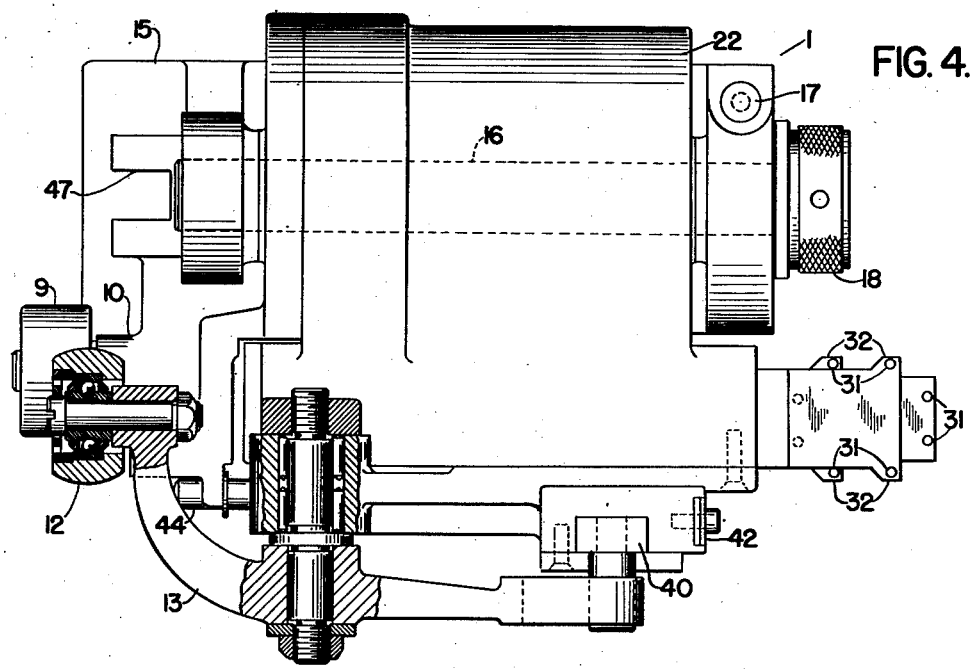
Fig. 4 is a top plan view of the head as in Fig. 3 with parts in section.
Figure 5:
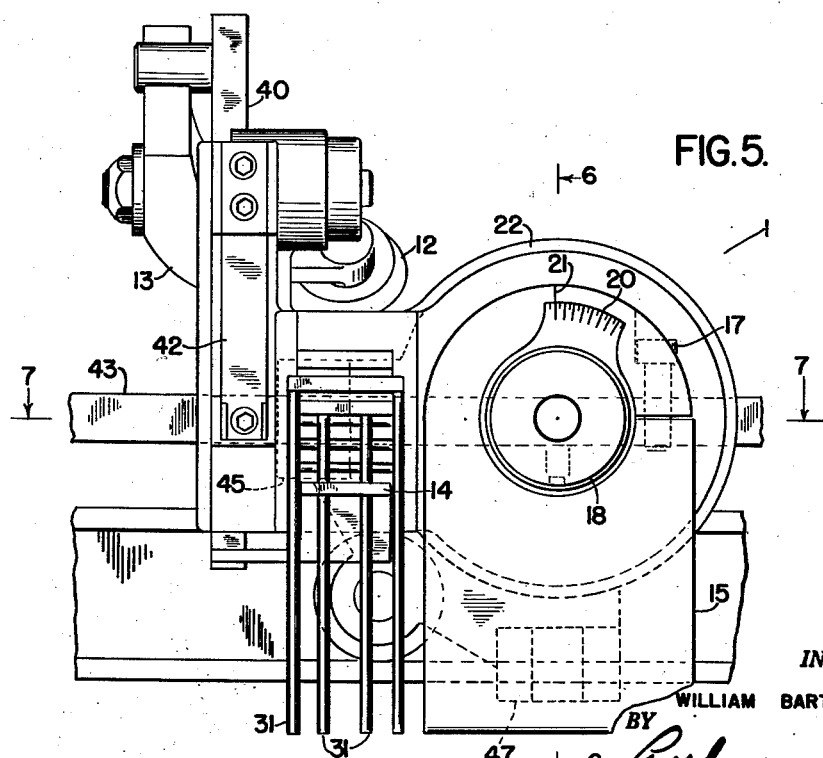
Fig. 5 is an end elevation of the head facing the fingers.
Figure 6:
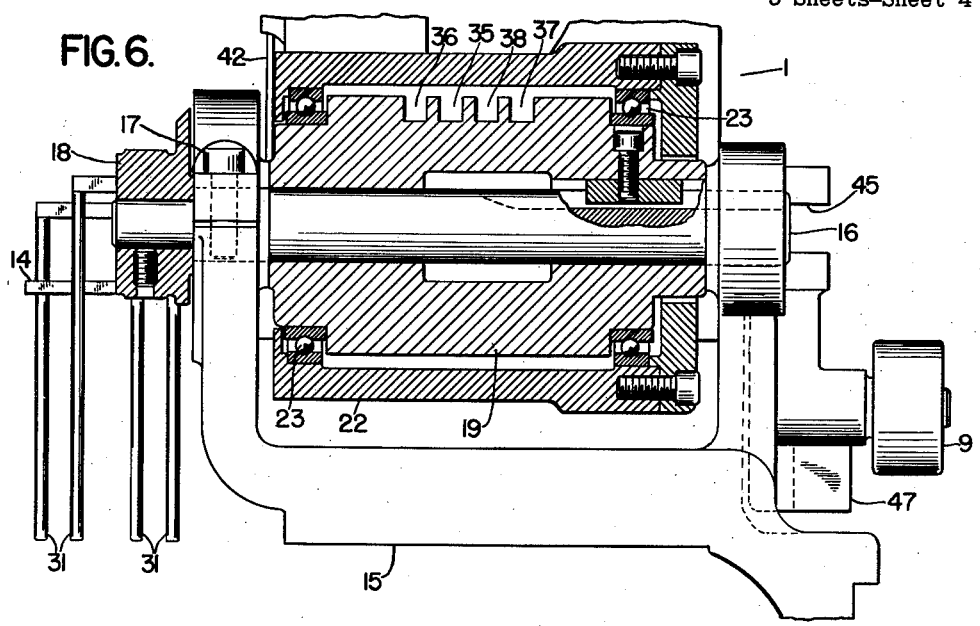
Fig. 6 is a vertical section taken axially of the head on line 6—6 of Fig. 5.

As shown in Figure 1 the heads 1 of the present invention are adapted to be carried by a rotary member 2 which rotates on a vertical axis and above a rotary table 3 having means thereon for carrying successive bottles 4, each indexed beneath a head for application of a seal 5 to the bottle top.

During rotation of member 2 a head 1 first passes a pick-up station where it picks up a seal 5 from a two-finger head 6 carried by a rotating member 7. The construction of a suitable two-finger head 6 and drive therefor is described in detail and claimed in applicant's co-pending application Serial No. 416,184, filed March 15, 1954.

After picking up a seal 5 the head 1 is carried in a circular path by member 2 and a bottle 4 is indexed therebeneath. Thereupon a fixed cam 8 adjacent the path of head 1 is engaged by a follower 9 at the end of a crank 10 to turn the head through 90° to present the seal 5 in vertical alignment with the bottle top. A second fixed cam 11 adjacent the path of the head 1 is then engaged by a follower 12 on the end of a lever 13 pivotally carried by the head 1 and which actuates a pusher 14 which forces the seal 5 downwardly onto the bottle top.

The rotary member 2 carries a plurality of heads 1 spaced circumferentially of the member and each mounted on a separate bracket 15.

Each bracket 15 is shaped like a clevis with two upstanding spaced arms carrying a horizontal shaft 16 adapted to be fixed in selected adjustable rotational position. For this purpose one arm of bracket 15 is split and a bolt 17 tightens the same upon shaft 16 so as to secure the latter against turning. A knob 18 is pinned to one end of the shaft and is adapted to adjust the position of the shaft when bolt 17 is loosened.

The shaft 16 carries a generally cylindrical cam body 19 which is keyed to the shaft to secure the cam body in adjusted rotational position determined by the adjusted position of the shaft. For this purpose knob 18 has a scale 20 on its circumference for registry with a mark 21 on the adjacent surface of the bracket.

The housing 22 for the eight finger head 1 is mounted for rotation on cam body 19 by means of the antifriction ball bearings 23, the cages of which are disposed concentric with shaft 16, one at each end of the cam body.

The housing 22 has a slide chamber 24 above the cam body 19 and extending parallel thereto with the side of the chamber toward the cam body open to accommodate cam actuation described hereinafter.

The chamber 24 is generally rectangular in section and contains four slide plates 25, 26, 27 and 28 with spacer plates 29 therebetween and between the outer slide plates 25 and 28 and the walls of the chamber. Each spacer plate 29 carries a pair of transverse needle rollers 30 near each end thereof and adapted to bear against the adjacent slides and chamber walls, as the case may be. Spacer plates 29 thus serve as bearing cages for rollers 30 which reduce the friction for longitudinal sliding of plates 25 to 28, inclusive.

The slide plates 25 to 28, inclusive, extend outwardly from one end of chamber 24 free of housing 22 and rigidly carry the eight fingers 31 for the head. For this purpose each slide plate carries two fingers, one at each side of the plate at the outer end of the plate. The top slide 25 and the bottom slide 28 have side lugs 32 for carrying the corresponding fingers 31 while the intermediate slides 26 and 27 carry their fingers 31 laterally spaced apart and near to the longitudinal center line of the corresponding slides.

Figure 8:
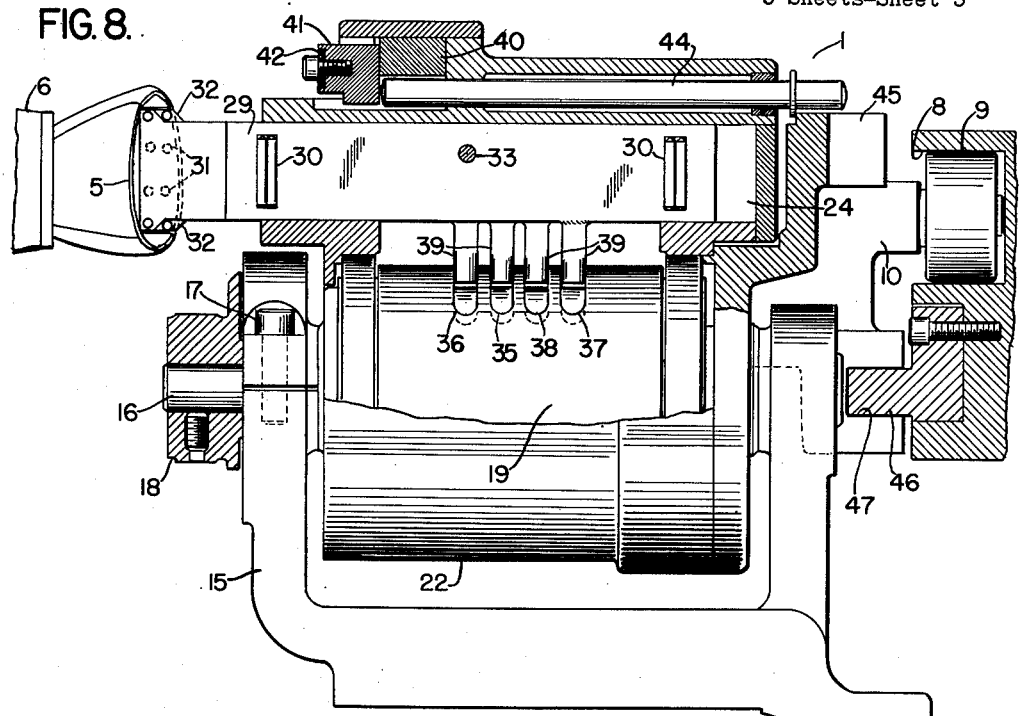
Fig. 8 is a vertical section of the head with the latter in pick-up position 90° from the head of Fig. 7 and taken on line 8—8 of Fig. 7.

When the fingers 31 are closed together the corresponding fingers of upper and lower slides 25 and 28 and the corresponding fingers of the intermediate slides 26 and 27 are closed together to form four laterally spaced pairs of fingers as shown in Fig. 8.

Figure 7:
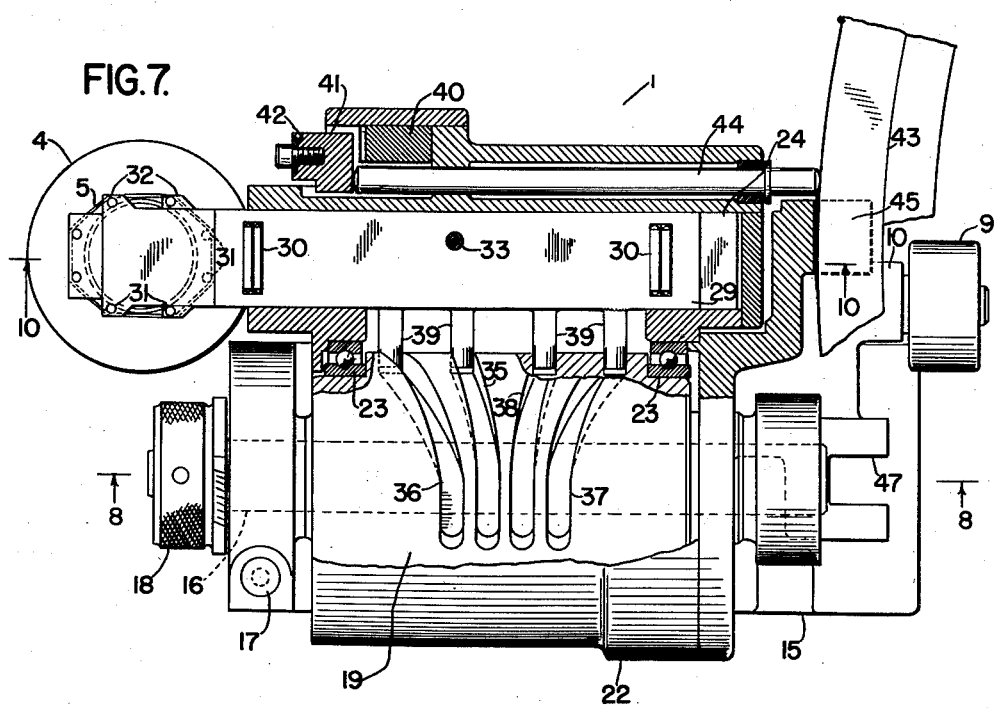
Fig. 7 is a horizontal section taken axially of the head on line 7—7 of Fig. 5.

When the fingers 31 are opened or separated, as shown in Fig. 7, the slides 25 to 28, inclusive, are moved longitudinally to the positions shown in Fig 10.

The spacers 29 are prevented from becoming displaced excessively, by means of a pin 33 which extends through housing 22 and through the slides 25 to 28 and the spacers 29. The slides 25 to 28 and also spacers 29 have slots 34 therein for receiving the pin 33 and which limit the movement of each spacer to a mean between the two immediately adjacent slides, and in the case of the upper and lower spacers to a mean between the adjacent slide and the chamber wall.

The movement of slides 25 to 28, inclusive, is effected by corresponding cam grooves 35, 36, 37 and 38 in the outer circumference of cam body 19 and into which tongues 39 extend from the corresponding slides. As housing 22 is rotated through 90° relative to the cam body 19, from a position where slide chamber 24 is above the cam body to a position to one side of the cam body, the cam grooves 35 to 38, inclusive, spread apart axially of the body 19 and tongues 39 riding in the grooves effect a longitudinal movement of the corresponding slides to separate the fingers 31 and open seal 5 to a substantially cylindrical shape. At the same time the fingers 31 are rotated from a forward horizontal direction to a vertical downward direction with the seal stretched thereon.

The rotational oscillation of head 22 is effected by the crank 10 and cam 8, as previously described.

The seal 5 is stripped from fingers 31 and dropped onto an indexed top of a bottle 4 by means of the pusher 14 extending across the fingers and carried by a slide 40 which is parallel to the fingers and adapted to move the pusher toward the free ends of the fingers.

The pusher slide 40 is carried by housing 22 and is actuated by the lever 13 and cam 11, as previously described. When cam follower 12 is out of cam groove 11 the slide 40 is locked in retracted position by means of the block 41 which is biased into a recess in the slide by means of the spring 42.

When it is time for the pusher 14 to be actuated cam follower 12 enters cam groove 11 and a cam rail 43 presses on the end of a lock release push rod 44 in housing 22 and which pushes block 41 against spring 42 and out of the recess in slide 40, as shown in Fig. 3.

After stripping of the seal 5 from fingers 31 by pusher 14 the cam groove 11 actuates lever 13 to retract slide 40 and pusher 14 upwardly and block 41 drops into the recess to lock the slide before cam follower 12 leaves the cam groove 11 and housing 22 is rotated back up to a horizontal position for fingers 31.

Figure 9:
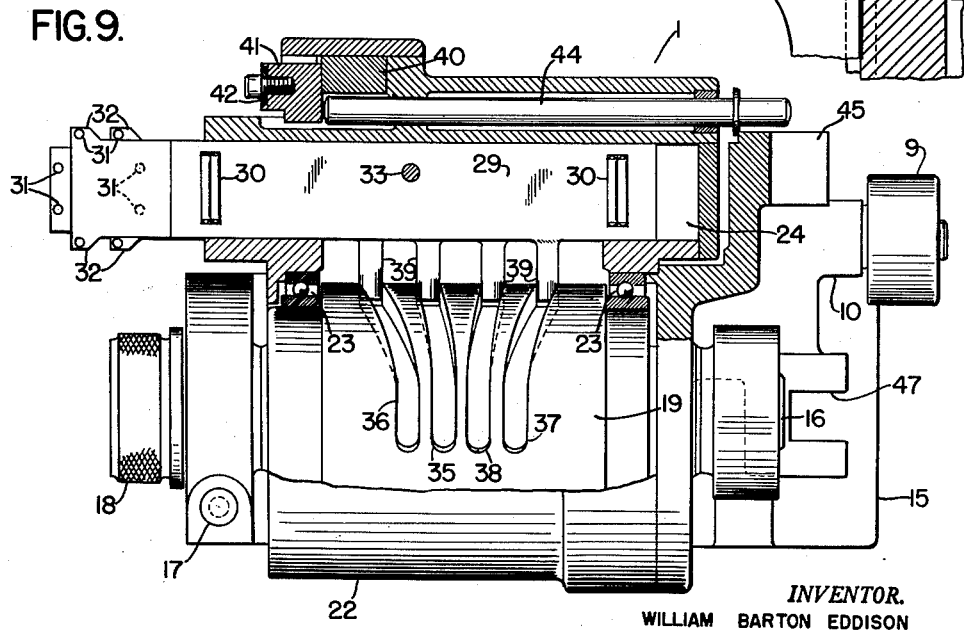
Fig. 9 is a view similar to Fig. 7 showing the cam drum adjusted for smaller seals.

The stripper pusher 14 serves as a stop for seals 5 as fingers 31 enter a seal at the pick-up station and prevents contamination of slides 25 to 28 from the seals. The spacers 29 and rollers 30 may be well greased without danger of gumming from seal solutions or other contamination.

Where seals of slightly different sizes are employed, the cam grooves 35 to 38 are constructed to extend for an additional 20 or 30° on cam body 19 to beyond the 90° of tongue operation therein, and the grooves have initial parallel adjacent courses for the additional length, as shown in Figs. 8 and 9. Then as knob 18 is adjusted to turn cam body 19 relative to the bracket 15 to bring tongues 39 into the parallel course of the grooves, the 90° rotation of housing 22 will not effect a full spreading of tongues 39, and the fingers 31 will then accommodate a smaller seal.

In order to maintain the housing 22 and fingers 31 in accurate position during application of a seal to a bottle top and provide for the necessary working looseness of cam follower 12 in groove 11, a groove 45 is provided in the end of housing 22 to receive cam rail 43 which accurately holds the head as the seal is pushed from fingers 31.

Similarly, the housing 22 and fingers 31 are accurately located during the pick-up of a seal by the fingers from head 6, by means of a track 46 which then rides in a groove 47 in the end of the housing. Grooves 45 and 47 are at right angles to each other and serve to retain the head in the two extreme positions which are 90° apart.

The head 1 is self-contained with the exception of the cam tracks which actuate the crank 10, the lever 13 and the lock push rod 44. All moving parts are protected against wear. The spacing of rollers 30 provide a substantial length of bearing for slides 25 to 28, inclusive, which prevents undesirable deflection of the fingers 31.

Various embodiments of the invention may be employed within the scope of the following claims which particularly point out and distinctly claim the subject matter regarded as the invention.

I claim:

1. In an apparatus of the class described, a seal opening and applying head comprising a cylindrical cam body having a plurality of circumferentially extending cams on the outer surface thereof, a housing rotatable upon said body, a plurality of adjacent slides in said housing and having corresponding cam followers for said cams to actuate said slides upon rotational oscillation of said housing relative to said body, and at least one finger rigidly carried by each of said slides to enter a seal, said fingers being parallel and movement of said slides relatively in one direction contracting the fingers relative to each other for entering a seal and movement of said slides relatively in the opposite direction expanding the fingers relative to each other to open the seal thereon to a substantially cylindrical shape.

2. The construction of claim 1 in which said slides comprise adjacent parallel plates having a free end of each extending from the housing to carry the fingers, and roller bearings are provided between the adjacent plates and between the outermost plates and the adjacent walls of the housing whereby friction is kept at a minimum and the plates are supported against deflection of the fingers carried thereby.

3. The construction of claim 1 in which said cams comprise cam grooves in the cam body, and said cam followers comprise lugs on said slides and which ride in the corresponding grooves.

4. In apparatus of the class described, a seal opening and applying head comprising a cylindrical cam body having a plurality of circumferentially extending cams on the outer surface thereof, a housing rotatable upon said body, a plurality of adjacent slides in said housing and having corresponding cam followers for said cams to actuate said slides upon rotational oscillation of said housing relative to said body, at least one finger rigidly carried by each of said slides to enter a seal, said fingers being parallel and movement of said slides relatively in one direction contracting the fingers relative to each other for entering a seal and movement of said slides relatively in the opposite direction expanding the fingers relative to each other to open the seal thereon to substantially cylindrical shape, rotary means to carry said cam body in a substantially horizontal circular path with said fingers extending forward in the direction of travel of the head and closed together for receiving and carrying a seal thereon, and cam means in the path of said head to rotate said housing approximately 90° to point said fingers downwardly and to actuate said slides whereby the fingers are expanded to open and hold the seal thereon.

5. The construction of claim 4 in which means are provided upon said rotary means to adjust the rotational position of said cam body thereon, and said cams are constructed of a length greater than 90° to provide for an adjustment in the slide movement to accommodate seals of different sizes.

6. The construction of claim 4 in which a tongue and groove interlock is provided between the housing and the frame of the apparatus to accurately hold the head in each of its extreme positions 90° apart.

7. In apparatus of the class described, a seal opening and applying head comprising a cylindrical cam body having a plurality of circumferentially extending cams on the outer surface thereof, a housing rotatable upon said body, a plurality of adjacent slides in said housing and having corresponding cam followers for said cams to actuate said slides upon rotational oscillation of said housing relative to said body, at least one finger rigidly carried by each of said slides to enter a seal, said fingers being parallel and movement of said slides relatively in one direction contracting the fingers relative to each other for entering a seal and movement of said slides relatively in the opposite direction expanding the fingers relative to each other to open the seal thereon to a substantially cylindrical shape, rotary means to carry said cam body in a substantially horizontal circular path with said fingers extending forward in the direction of travel of the head and closed together for receiving and carrying a seal thereon, cam means in the path of said head to rotate said housing approximately 90° to point said fingers downwardly and to actuate said slides whereby the fingers are expanded to open and hold the seal thereon, and means operating in correlation to the movement of said rotary means to push the seal downwardly from said fingers.

8. The construction of claim 7 in which said pusher means is actuated by a second cam adjacent the path of movement of the head, and a lock is provided to secure the pusher in retracted position, with means to release the lock in correlation to actuation of the pusher by said second cam.

9. A seal opening and applying head comprising a cam body having a cylindrical surface with at least one circumferentially and longitudinally extending cam, a rotatable member having its rotational axis generally coinciding with the axis of the cam containing surface of said cam body, at least one slide carried by said rotatable member and having a seal carrying finger thereon, and means carried by said rotatable member and engaging said cam to actuate said slide upon rotation of said member relative to said cam body.

10. A seal opening and applying head comprising a generally cylindrical cam body having cam means on the outer surface thereof and extending circumferentially and longitudinally thereof, a housing relatively rotatable upon said body, a plurality of adjacent slides in said housing, cam follower means carried by said slides and interengaging with said cam means to actuate said slides upon relative rotation between said cam body and said housing, and seal carrying means on said slides.

References Cited in the file of this patent

UNITED STATES PATENTS

| | | |
|---|---|---|
| 2,601,547 | Minock | June 24, 1952 |
| 2,630,956 | Pomeroy et al. | Mar. 10, 1953 |
| 2,644,628 | Gunter et al. | July 7, 1953 |
| 2,673,674 | Eddison | Mar. 30, 1954 |